United States Patent
Sun et al.

(10) Patent No.: US 12,047,214 B2
(45) Date of Patent: Jul. 23, 2024

(54) METHOD FOR REFERENCE SIGNAL GENERATION AND COMMUNICATIONS DEVICE

(71) Applicant: VIVO MOBILE COMMUNICATION CO., LTD., Chang'an Dongguan (CN)

(72) Inventors: Xiaodong Sun, Chang'an Dongguan (CN); Hao Liu, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 381 days.

(21) Appl. No.: 17/403,218

(22) Filed: Aug. 16, 2021

(65) Prior Publication Data

US 2021/0377087 A1 Dec. 2, 2021

Related U.S. Application Data

(63) Continuation of application No. PCT/CN2020/075028, filed on Feb. 13, 2020.

(30) Foreign Application Priority Data

Feb. 15, 2019 (CN) .......................... 201910117787.2

(51) Int. Cl.
H04L 27/26 (2006.01)
H04L 5/00 (2006.01)

(52) U.S. Cl.
CPC ........ H04L 27/2613 (2013.01); H04L 5/0048 (2013.01)

(58) Field of Classification Search
CPC . H04L 27/2613; H04L 5/0048; H04L 5/0053; H04L 27/20; H04L 27/0008;
(Continued)

(56) References Cited

U.S. PATENT DOCUMENTS

2009/0080569 A1 3/2009 Han et al.
2017/0289924 A1* 10/2017 Fu .................. H04L 5/0051
(Continued)

FOREIGN PATENT DOCUMENTS

CN 103281277 A 9/2013
CN 108809609 A 11/2018
(Continued)

OTHER PUBLICATIONS

"Lower PAPR reference signals" 3GPP TSG RAN WG1 Meeting #95 Spokane, WA, USA, Nov. 12-16, 2018 (R1-1813445) (Year: 2018).*
(Continued)

*Primary Examiner* — Ian N Moore
*Assistant Examiner* — Sun Jong Kim
(74) *Attorney, Agent, or Firm* — von Briesen & Roper, s.c.

(57) ABSTRACT

A method for reference signal generation and a communications device are provided. The method includes: in a case that indication information is received from a second communications device, performing first modulation and then discrete Fourier transform modulation on at least one of target-reference-signal sequences to generate a target reference signal, where the first modulation includes any one of the following: π/2-BPSK modulation and 8-PSK modulation, and the indication information is used to indicate that a first communications device uses the target reference signal for transmission.

20 Claims, 3 Drawing Sheets

(58) Field of Classification Search
CPC ........... H04L 27/2646; H04L 27/26035; H04L 27/2614; H04L 27/2636; H04L 27/26134; H04L 5/0051; H04L 5/0016; H04L 27/26132; H04L 27/26136
See application file for complete search history.

(56) References Cited

U.S. PATENT DOCUMENTS

| | | | |
|---|---|---|---|
| 2018/0097594 A1* | 4/2018 | Wang | H04L 5/0048 |
| 2018/0324005 A1 | 11/2018 | Kim et al. | |
| 2019/0132177 A1* | 5/2019 | Wang | H04L 1/003 |
| 2020/0021414 A1 | 1/2020 | Ding et al. | |
| 2020/0059335 A1 | 2/2020 | Hu et al. | |
| 2020/0076670 A1 | 3/2020 | Liu et al. | |
| 2021/0144038 A1* | 5/2021 | Davydov | H04L 5/0023 |
| 2022/0104254 A1* | 3/2022 | Matsumura | H04W 76/10 |

FOREIGN PATENT DOCUMENTS

| | | |
|---|---|---|
| CN | 109219134 A | 1/2019 |
| CN | 109245844 A | 1/2019 |
| CN | 109246042 A | 1/2019 |

OTHER PUBLICATIONS

Extended European search report related to Application No. 20756280.2 reported on Mar. 9, 2022.

R1-1900505, Source: Intel Corporation, "Low PAPR Reference Signals" Document for: Discussion and Decision, Agenda Item: 7.2.8.5, Release: 3GPP TSG RAN WG1 Ad-Hoc Meeting 1901, Jan. 21-25, 2019, Taipei, Taiwan.

R1-1900673, Source: NEC, "Discussion on low PAPR RS" Document for: Discussion and Decision, Agenda Item: 7.2.8.5, Release: 3GPP TSG RAN WG1 Ad-Hoc Meeting 1901, Jan. 21-25, 2019, Taipei, China.

R1-1901292, Source: Ericsson, "Remaining detalls on low PAPR RS" Document for: Discussion and Decision, Agenda Item: 7.2.8.5, Release: 3GPP TSG RAN WG1 Meeting Ad-Hoc Meeting 1901, Jan. 21-25, 2019, Taipei, Taiwan.

R1-1901317, Source: Qualcomm Incorporated, "Lower PAPR reference signals" Document for: Discussion/Decision, Agenda Item: 7.2.8.5, Release: 3GPP TSG RAN WG1 Ad-Hoc Meeting 1901, Jan. 21-25, 2019, Taipei, Taiwan.

R1-1904099, Source: vivo, "Further discussion on low PAPR RS" Document for: Discussion and Decision, Agenda Item: 7.2.8.5, Release: 3GPP TSG RAN WG1 #96bis, Apr. 8-12, 2019, Xi'an, China.

International Search Report & Written Opinion related to Application No. PCT/CN2020/075028 reported on May 6, 2020.

First Office Action for related Chinese Application No. 201910117787.2 reported on Oct. 28, 2020.

R1-1715967—Source: Samsung "Remaining details on DMRS", Agenda Item: 6.2.3.3, Document for: Discussion and Decision, 3GPP TSG RAN WG1 Meeting NR#3, Nagoya, Japan, Sep. 18-21, 2017.

R1-1813892, Source: Intel Corporation "Low PAPR Reference Signals", Agenda Item: 7.2.8.5, Document for: 4 Discussion and Decision, 3GPP TSG RAN WG1 Meeting #95, Spokane, USA, Nov. 12-16, 2018.

Singapore Office Action related to Application No. 11202108870W reported on Sep. 8, 2023.

Huawei, Hisilicon, "Discussion on DMRS sequence design for low PAPR", Jan. 21-25, 2019, 3GPP TSG RAN WG1 Ad-Hoc Meeting 1901, Agenda Item: 7.2.8.5, R1-1900020, Taipei.

* cited by examiner

METHOD FOR REFERENCE SIGNAL GENERATION AND COMMUNICATIONS DEVICE

CROSS-REFERENCE TO RELATED APPLICATIONS

This application is a continuation application of International Application No. PCT/CN2020/075028 filed on Feb. 13, 2020, which claims priority to Chinese Patent Application No. 201910117787.2, filed in China on Feb. 15, 2019, which is incorporated herein by reference in its entirety.

TECHNICAL FIELD

Embodiments of this disclosure relate to the field of communications technologies, and in particular, to a method for reference signal generation and a communications device.

BACKGROUND

In a new radio (New Radio, NR) mobile communications system in related arts, reference signals for traffic and control channels are generated by using a PN sequence or a ZC sequence. In a case that transmission precoding (also known as DFT-s-OFDM waveform) is used for physical uplink shared channel (Physical Uplink Shared Channel, PUSCH) or physical uplink control channel (Physical Uplink Control Channel, PUCCH), peak to average power ratio (Peak to Average Power Ratio, PAPR) of demodulation reference signal (Demodulation Reference Signal, DMRS) symbols is higher than PAPR of data symbols, affecting uplink coverage performance.

SUMMARY

Embodiments of this disclosure provide a method for reference signal generation and a communications device, to resolve the problem of relatively high PAPR for DMRS symbols.

According to a first aspect of the embodiments of this disclosure, a method for reference signal generation is provided, applied to a first communications device and including:

in a case that indication information is received from a second communications device, performing first modulation and then discrete Fourier transform modulation on at least one of target-reference-signal sequences to generate a target reference signal.

The first modulation includes any one of the following: $\pi/2$-binary phase shift keying BPSK modulation and 8-phase shift keying PSK modulation, and the indication information is used to indicate that the first communications device uses the target reference signal for transmission.

According to a second aspect of the embodiments of this disclosure, a first communications device is further provided, including:

a first generating module, configured to: in a case that indication information is received from a second communications device, perform first modulation and then discrete Fourier transform modulation on at least one of target-reference-signal sequences to generate a target reference signal, where the first modulation includes any one of the following: $\pi/2$-BPSK modulation and 8-PSK modulation, and the indication information is used to indicate that the first communications device uses the target reference signal for transmission.

According to a third aspect of the embodiments of this disclosure, a communications device is further provided, including: a processor, a memory, and a program stored in the memory and capable of running on the processor. When the program is executed by the processor, the steps of the method for reference signal generation described above are implemented.

According to a fourth aspect in the embodiments of this disclosure, a computer-readable storage medium is further provided. A computer program is stored in the computer-readable storage medium, and when the computer program is executed by a processor, the steps of the method for reference signal generation described above are implemented.

With the embodiments of this disclosure, PAPR of DMRS symbols being higher than PAPR of data symbols when transmission precoding is used for PUSCH or PUCCH can be avoided, thereby improving uplink coverage performance.

BRIEF DESCRIPTION OF DRAWINGS

Other advantages and benefits will become apparent to those of ordinary skill in the art by reading detailed description of the exemplary embodiments below. The accompanying drawings are merely intended to illustrate the purposes of the preferred implementations, and should not be construed as a limitation on this disclosure. Throughout the accompanying drawings, the same reference numerals represent the same components. In the accompanying drawings.

DESCRIPTION OF EMBODIMENTS

Figure 1:
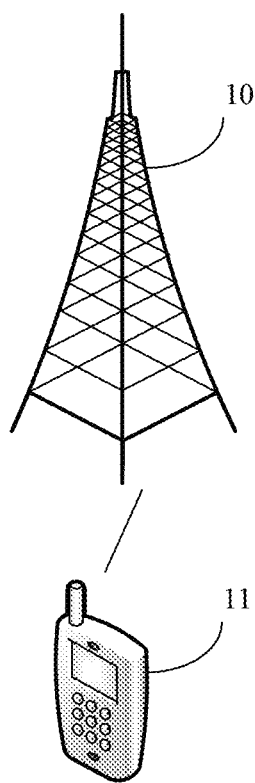
FIG. 1 is a schematic architectural diagram of a wireless communications system according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: only A, only B, or both A and B.

In the embodiments of this disclosure, terms such as "an example" or "for example" are used to represent examples, illustrations, or explanations. Any embodiment or design solution described as "an example" or "for example" in the embodiments of this disclosure should not be construed as being more preferred or advantageous than other embodiments or design solutions. To be precise, the words such as "an example" or "for example" are intended to present a related concept in a specific manner.

Techniques described in this specification are not limited to a 5G system and a later evolved communications system, and also are not limited to an LTE/LTE-Advanced (LTE-Advanced, LTE-A) system, and may also be applied to various wireless communications systems, for example, code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems.

The terms "system" and "network" are usually used interchangeably. The CDMA system can implement radio technologies such as CDMA2000 and Universal Terrestrial Radio Access (Universal Terrestrial Radio Access, UTRA). The UTRA includes wideband CDMA (Wideband Code Division Multiple Access, WCDMA) and other CDMA variants. The TDMA system can implement radio technologies such as the Global System for Mobile Communications (Global System for Mobile Communication, GSM). The OFDMA system can implement radio technologies such as ultra mobile broadband (Ultra Mobile Broadband, UMB), evolved UTRA (Evolution-UTRA, E-UTRA), IEEE 802.11 (Wi-Fi), IEEE 802.16 (WiMAX), IEEE 802.20, and Flash-OFDM. The UTRA and E-UTRA are parts of the Universal Mobile Telecommunications System (Universal Mobile Telecommunications System, UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "3rd Generation Partnership Project" (3rd Generation Partnership Project, 3GPP). The CDMA2000 and UMB are cited from descriptions of the documentation of the organization named "3rd Generation Partnership Project 2" (3GPP2). Techniques described in this specification may be used in the aforementioned systems and radio technologies, and can also be used in other systems and radio technologies.

The following describes the embodiments of this disclosure with reference to the accompanying drawings. A method for reference signal generation provided in the embodiments of this disclosure may be applied to a wireless communications system. Referring to FIG. 1, FIG. 1 is a schematic architectural diagram of a wireless communications system according to an embodiment of this disclosure. As shown in FIG. 1, the wireless communications system may include a network device 10 and a terminal. The terminal is denoted as user equipment (User Equipment, UE) 11, and the UE 11 may communicate (transmit signaling or transmit data) with the network device 10. In an actual application, connections between the foregoing devices may be wireless connections. To conveniently and intuitively represent a connection relationship between the devices, a solid line is used in FIG. 1. It should be noted that the communications system may include a plurality of UEs 11, and the network device 10 may communicate with the plurality of UEs 11.

The terminal provided in this embodiment of this disclosure may be a mobile phone, a tablet computer, a notebook computer, an ultra-mobile personal computer (Ultra-Mobile Personal Computer, UMPC), a netbook, a personal digital assistant (Personal Digital Assistant, PDA), a mobile Internet device (Mobile Internet Device, MID), a wearable device (Wearable Device), an in-vehicle device, or the like.

The network device 10 provided in this embodiment of this disclosure may be a base station. The base station may be a generally used base station, or may be an evolved base station (evolved node base station, eNB), or may be a device such as a network device (for example, a next generation base station (next generation node base station, gNB)) or a transmission and reception point (transmission and reception point, TRP) in a 5G system.

For a better understanding of the embodiments of the present disclosure, the following first describes a manner of generating a DMRS sequence by using a low-PAPR sequence.

In an NR system, in a case that transmission precoding is used for a PUSCH and a PUCCH, a DMRS sequence is generated by using a low-PAPR sequence (which is also referred to as a Zadoff-Chu sequence).

In a case that a length of the DMRS sequence is 6, 12, 18, or 24, the Zadoff-Chu sequence is generated through computer searching.

Figure 2:
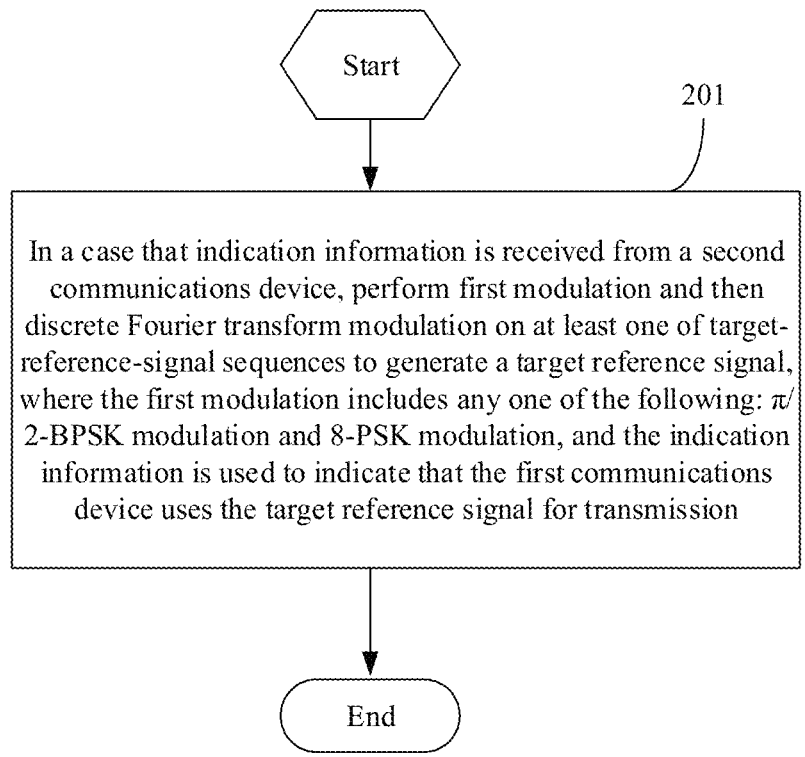
FIG. 2 is a flowchart of a method for reference signal generation according to an embodiment of this disclosure.

Referring to FIG. 2, an embodiment of this disclosure provides a method for reference signal generation. The method is executed by a first communications device. It should be noted that the first communications device may be a terminal and a second communications device may be a network device; or that the first communications device may be a network device and the second communications device may be a terminal. Specific steps include step 201.

Step 201: In a case that indication information is received from the second communications device, perform first modulation and then discrete Fourier transform modulation on at least one of target-reference-signal sequences to generate a target reference signal, where the first modulation includes any one of the following: π/2-BPSK modulation and 8-PSK modulation, and the indication information is used to indicate that the first communications device uses the target reference signal for transmission. In other words, the indication information is related to the target reference signal, and for brevity, details are not repeated herein.

In this embodiment of this disclosure, optionally, in a case that a physical channel demodulation reference signal or a channel state information acquisition reference signal is transmitted based on transmission precoding, and the second communications device indicates that the first communications device uses the target reference signal for transmission, first modulation is performed on the at least one of target-reference-signal sequences to generate the target reference signal.

In this embodiment of this disclosure, optionally, the physical channel demodulation reference signal includes one or more of the following: PUSCH DMRS, physical downlink shared channel (Physical Downlink Shared Channel, PDSCH) DMRS, physical Sidelink shared channel (Physical Sidelink Shared Channel, PSSCH) DMRS, PUCCH DMRS, physical downlink control channel (Physical Downlink Control Channel, PDCCH) DMRS, physical Sidelink control channel (Physical Sidelink Control Channel, PSCCH) DMRS, and physical broadcast channel (Physical broadcast channel, PBCH) DMRS.

In this embodiment of this disclosure, optionally, the channel state information acquisition reference signal includes one or more of the following: sounding reference signal (Sounding Reference Signal, SRS) and channel state information reference signal (Channel State Information-Reference Signal, CSI-RS).

A physical channel may be at least one of a service channel, a control channel, and a broadcast channel. The reference signal may include at least one of a DMRS and an SRS.

For example, the second communications device is a network device, and the indication information is transmitted by using radio resource control (Radio Resource Control, RRC) signaling or downlink control information (Downlink Control Information, DCI).

In a case that the number of subcarriers occupied by the target reference signal is 6, the target-reference-signal sequence includes at least one of the sequences in Table 1.

In this embodiment of this disclosure, optionally, in resource mapping for the target reference signal, for any DMRS port, a frequency domain orthogonal cover code (FD-OCC) is [+1, +1].

For example, in resource mapping for the target reference signal, both the TD-OCC and the FD-OCC may be [+1, +1].

Based on the foregoing OCC sequence, influence of the OCC sequence on the shift auto-correlation, the PAPR, the cross-correlation, and demodulation performance of the target reference signal can be avoided.

In this embodiment of this disclosure, optionally, the method shown in FIG. 2 may further include: generating the target-reference-signal sequence according to a predetermined rule.

The predetermined rule may include one or more of the following:

(1) An average value of shift auto-correlation between reference signal modulation symbols of the target reference signal is the smallest. For example, the average value of shift auto-correlation between the reference signal modulation symbols of the target reference signal is less than 0.5.

TABLE 1

Sequence table applicable to computer generated sequence 6
(Computer Generated Sequence, CGS-6)

| Index (Index) | CGS-6 | | | | | | Average value of shift auto-correlation (−5 to 5) | Cross-correlation value | Peak-to-average power ratio (dB) | Block error rate (%) (SINR = −5dB) |
|---|---|---|---|---|---|---|---|---|---|---|
| 0  | 7  | 3  | −1 | −5 | −1 | 3  | 0.13 | 0.33 | 0.78 | 3.80 |
| 1  | 7  | −5 | 7  | −5 | 7  | 3  | 0.13 | 0.34 | 1.53 | 3.40 |
| 2  | 5  | −7 | 5  | −7 | −3 | −7 | 0.13 | 0.28 | 1.53 | 3.40 |
| 3  | 3  | 1  | 5  | 1  | 5  | −7 | 0.18 | 0.34 | 1.63 | 2.20 |
| 4  | 1  | 5  | −7 | 7  | 1  | 5  | 0.18 | 0.29 | 1.46 | 3.00 |
| 5  | 7  | −5 | 3  | 5  | −1 | −7 | 0.17 | 0.37 | 1.95 | 2.20 |
| 6  | 3  | −1 | 3  | −3 | −5 | −1 | 0.18 | 0.30 | 1.46 | 3.40 |
| 7  | 5  | −7 | 7  | 1  | 5  | 1  | 0.18 | 0.36 | 1.46 | 3.20 |
| 8  | −3 | 7  | −5 | −1 | −5 | −1 | 0.18 | 0.32 | 1.63 | 3.00 |
| 9  | 5  | −1 | −3 | −1 | 5  | −5 | 0.14 | 0.30 | 1.99 | 2.20 |
| 10 | 7  | −7 | 1  | 5  | 3  | −3 | 0.17 | 0.37 | 1.95 | 3.60 |
| 11 | 7  | 1  | 7  | −3 | −1 | −3 | 0.14 | 0.32 | 1.99 | 1.80 |
| 12 | 7  | 1  | −5 | −7 | −5 | 1  | 0.14 | 0.40 | 1.99 | 2.00 |
| 13 | −5 | 5  | −1 | −3 | −1 | 5  | 0.14 | 0.40 | 1.99 | 2.40 |
| 14 | −5 | −1 | −7 | 7  | −5 | −1 | 0.18 | 0.42 | 1.46 | 3.00 |
| 15 | 5  | 7  | −3 | −5 | 5  | −5 | 0.14 | 0.29 | 2.34 | 3.00 |
| 16 | −1 | 1  | 5  | −5 | 7  | 3  | 0.17 | 0.32 | 2.17 | 3.80 |
| 17 | 3  | 5  | −1 | 5  | −1 | −3 | 0.14 | 0.27 | 2.34 | 2.80 |
| 18 | 7  | −7 | 5  | 1  | −3 | 3  | 0.17 | 0.33 | 2.17 | 4.20 |
| 19 | 7  | −1 | −3 | 5  | −7 | 5  | 0.18 | 0.32 | 2.37 | 2.40 |
| 20 | 7  | 5  | −7 | 1  | −3 | 7  | 0.16 | 0.34 | 2.27 | 3.00 |
| 21 | −1 | −3 | 3  | 5  | −1 | 5  | 0.14 | 0.33 | 2.34 | 2.40 |
| 22 | 7  | −1 | 3  | 1  | 1  | −5 | 0.16 | 0.35 | 2.27 | 3.40 |
| 23 | −3 | −5 | −5 | 5  | 1  | −7 | 0.16 | 0.34 | 2.27 | 3.40 |
| 24 | 5  | −7 | 7  | 1  | 5  | 1  | 0.18 | 0.36 | 1.46 | 3.20 |
| 25 | 3  | −7 | −3 | −1 | −5 | 7  | 0.17 | 0.35 | 2.17 | 4.00 |
| 26 | 7  | 1  | −5 | −7 | −5 | 1  | 0.14 | 0.40 | 1.99 | 2.00 |
| 27 | −7 | 5  | 7  | −5 | 1  | −3 | 0.17 | 0.33 | 2.17 | 4.40 |
| 28 | −5 | 5  | −1 | −3 | −1 | 5  | 0.14 | 0.40 | 1.99 | 2.40 |
| 29 | −5 | −1 | −7 | 7  | −5 | −1 | 0.18 | 0.42 | 1.46 | 3.00 |

Preferably, the target reference signal may be generated based on at least one of sequences with indexes 0 to 14 shown in Table 1. To be specific, first modulation is performed on the at least one of sequences with indexes 0 to 14 shown in Table 1, and then discrete Fourier transform modulation is performed to generate the target reference signal. The first modulation includes any one of the following: π/2-BPSK modulation and 8-PSK modulation.

In this embodiment of this disclosure, optionally, in resource mapping for the target reference signal, for any DMRS port, a time domain orthogonal cover code (TD-OCC) is [+1, +1].

(2) A PAPR value of corresponding time-domain symbols resulting from inverse Fourier transform on reference signal modulation symbols of the target reference signal is the smallest, for example, the PAPR value is less than 2.5 dB.

(3) An average value of cross-correlation between reference signal modulation symbols of the target reference signal is the smallest. For example, the average value of cross-correlation between the reference signal modulation symbols of the target reference signal is less than 0.5.

(4) Demodulation performance of the target-reference-signal sequence meets a specified requirement. For example, in a case of a same signal to interference plus noise ratio (Signal to Interference plus Noise Ratio, SINR), a block error rate (Block Error Rate, BLER) is the smallest. For example, when SINR=−5, BLER<5%.

With this embodiment of this disclosure, PAPR of DMRS symbols being higher than PAPR of data symbols when transmission precoding is used for PUSCH or PUCCH can be avoided, thereby improving power amplifier efficiency of a transmit end to reduce power consumption, and improving demodulation performance of a receive end to improve uplink coverage.

Example 1

In a case that a network side indicate that a terminal uses DFT-s-OFDM waveform for PUSCH transmission, the modulation scheme is: (1) first perform π/2-BPSK modulation and then perform discrete Fourier transform modulation; or (2) first perform 8-PSK modulation and discrete Fourier transform, where when the number of resources is one physical resource block (Physical Resource Block, PRB), preferably, a PUSCH DMRS is generated through DFT modulation based on at least one of sequences with indexes 0 to 14 shown in Table 1.

Example 2

In a case that a network side indicates that a terminal uses DFT-s-OFDM waveform for PUSCH transmission, the modulation scheme is: (1) first perform π/2-BPSK modulation and then discrete Fourier transform modulation; or (2) first perform 8-PSK modulation and then discrete Fourier transform, where when the number of resources is one PRB and the number of DMRS port is one, an FD-OCC used in DMRS resource mapping is [+1, +1], instead of the FD-OCC of [+1, −1] in the related art.

An embodiment of this disclosure further provides a first communications device. A problem resolving principle of the first communications device is similar to that of the method for reference signal generation in the embodiments of this disclosure; therefore, for implementation of the first network device, reference may be made to the implementation of the method, and details are not described herein again.

Figure 3:
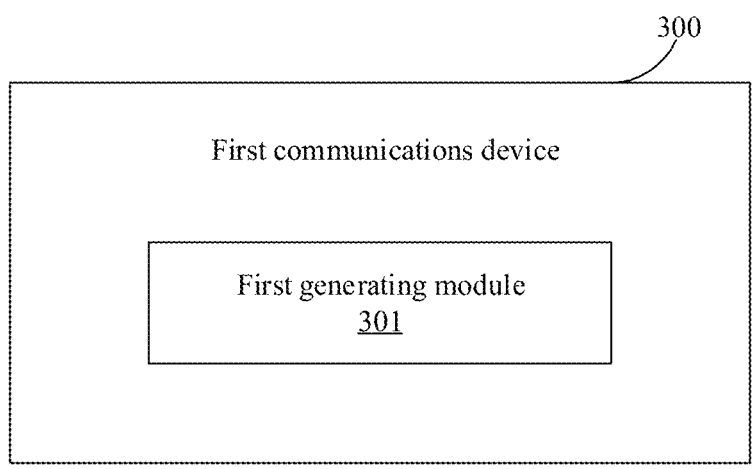
FIG. 3 is a structural diagram of a first communications device according to an embodiment of this disclosure.

Referring to FIG. 3, an embodiment of this disclosure further provides a first communications device, and the first communications device 300 includes:

a first generating module 301, configured to: in a case that indication information is received from a second communications device, perform first modulation and then discrete Fourier transform modulation on at least one of target-reference-signal sequences to generate a target reference signal.

The first modulation includes any one of the following: (1) π/2-BPSK modulation and (2) 8-PSK modulation. The indication information is used to indicate that the first communications device uses the target reference signal for transmission.

In this embodiment of this disclosure, optionally, in a case that the number of subcarriers occupied by the target reference signal is 6, the target-reference-signal sequence includes at least one of the following sequences:
7, 3, −1, −5, −1, 3;
7, −5, 7, −5, 7, 3;
5, −7, 5, −7, −3, −7;
3, 1, 5, 1, 5, −7;
1, 5, −7, 7, 1, 5;
7, −5, 3, 5, −1, −7;
3, −1, 3, −3, −5, −1;
5, −7, 7, 1, 5, 1;
−3, 7, −5, −1, −5, −1;
5, −1, −3, −1, 5, −5;
7, −7, 1, 5, 3, −3;
7, 1, 7, −3, −1, −3;
7, 1, −5, −7, −5, 1;
−5, 5, −1, −3, −1, 5; and
−5, −1, −7, 7, −5, −1.

In this embodiment of this disclosure, optionally, the target-reference-signal sequence further includes at least one of the following sequences:
5, 7, −3, −5, 5, −5;
−1, 1, 5, −5, 7, 3;
3, 5, −1, 5, −1, −3;
7, −7, 5, 1, −3, 3;
7, −1, −3, 5, −7, 5;
7, 5, −7, 1, −3, 7;
−1, −3, 3, 5, −1, 5;
7, −1, 3, 1, 1, −5;
−3, −5, −5, 5, 1, −7;
5, −7, 7, 1, 5, 1;
3, −7, −3, −1, −5, 7;
7, 1, −5, −7, −5, 1;
−7, 5, 7, −5, 1, −3;
−5, 5, −1, −3, −1, 5; and
−5, −1, −7, 7, −5, −1.

In this embodiment of this disclosure, optionally, in resource mapping for the target reference signal, for any DMRS port, a TD-OCC is [+1, +1].

In this embodiment of this disclosure, optionally, in resource mapping for the target reference signal, for any DMRS port, an FD-OCC is [+1, +1].

In this embodiment of this disclosure, optionally, the first generating module 301 is further configured to: in a case that a physical channel demodulation reference signal or a channel state information acquisition reference signal is transmitted based on transmission precoding, perform first modulation and then discrete Fourier transform modulation on the at least one of target-reference-signal sequences to generate the target reference signal.

In this embodiment of this disclosure, optionally, the physical channel demodulation reference signal includes one or more of the following: PUSCH DMRS, PDSCH DMRS, PSSCH DMRS, PUCCH DMRS, PDCCH DMRS, PSCCH DMRS, and PBCH DMRS.

In this embodiment of this disclosure, optionally, the channel state information acquisition reference signal includes one or more of the following: SRS and CSI-RS.

In this embodiment of this disclosure, optionally, the first communications device further includes:

a second generating module, configured to generate the target-reference-signal sequence according to a predetermined rule.

The predetermined rule includes one or more of the following:

an average value of shift auto-correlation between reference signal modulation symbols of the target reference signal is the smallest;

a peak-to-average power ratio PAPR value of corresponding time-domain symbols resulting from inverse Fourier transform on reference signal modulation symbols of the target reference signal is the smallest;

an average value of cross-correlation between reference signal modulation symbols of the target reference signal is the smallest; and demodulation performance of the target-reference-signal sequence meets a specified requirement.

The first communications device provided in this embodiment of this disclosure is capable of executing the foregoing method embodiment, and implementation principles and technical effects thereof are similar. Therefore, details are not described herein again.

Figure 4:
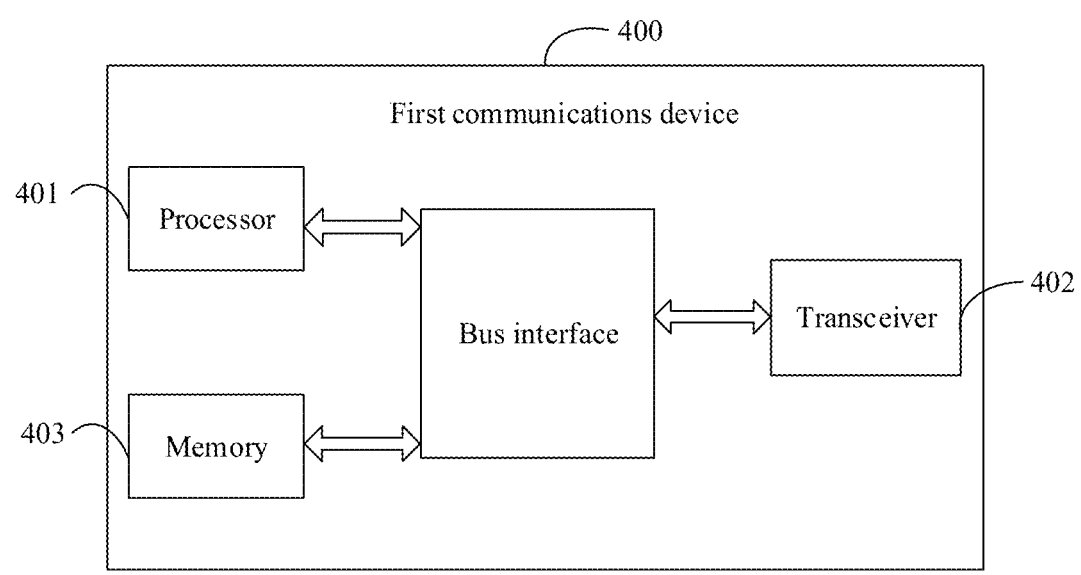
FIG. 4 is a structural diagram of a communications device according to an embodiment of this disclosure.

Referring to FIG. 4, FIG. 4 is a structural diagram of a communications device to which an embodiment of this disclosure is applied. As shown in FIG. 4, the communications device 400 includes a processor 401, a transceiver 402, a memory 403, and a bus interface.

In an embodiment of this disclosure, the communications device 400 further includes a program stored in the memory 403 and capable of running on the processor 401. When the program is executed by the processor 401, the following steps are implemented: in a case that indication information is received from a second communications device, performing first modulation and then discrete Fourier transform modulation on at least one of target-reference-signal sequences to generate a target reference signal. The first modulation includes any one of the following: (1) $\pi/2$-BPSK modulation and (2) 8-PSK modulation, and the indication information is used to indicate that the first communications device uses the target reference signal for transmission.

In FIG. 4, a bus architecture may include any quantity of interconnected buses and bridges, and specifically connects together circuits that are of one or more processors represented by the processor 401 and of a memory represented by the memory 403. The bus architecture may further interconnect various other circuits such as a peripheral device, a voltage regulator, and a power management circuit. These are all well known in the art, and therefore are not further described in this specification. The bus interface provides an interface. The transceiver 402 may be a plurality of components, including a transmitter and a receiver, and provides units for communicating with a variety of other apparatuses on a transmission medium.

The processor 401 is responsible for management of the bus architecture and general processing, and the memory 403 is capable of storing data that is used by the processor 401 during operation.

The communications device provided in this embodiment of this disclosure is capable of executing the foregoing method embodiment, and implementation principles and technical effects thereof are similar. Therefore, details are not described herein again.

An embodiment of this disclosure further provides a computer-readable storage medium. The computer-readable storage medium stores a computer program, and when the computer program is executed by a processor, the processes of the embodiment of the method for reference signal generation are implemented, with the same technical effect achieved. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for reference signal generation, applied to a first communications device and comprising:
   in a case that indication information is received from a second communications device, performing first modulation and then discrete Fourier transform modulation on at least one of target-reference-signal sequences to generate a target reference signal; wherein
   the first modulation comprises any one of the following: $\pi/2$-binary phase shift keying (BPSK) modulation and 8-phase shift keying (PSK) modulation, and the indication information is used to indicate that the first communications device uses the target reference signal for transmission;
   in a case that the number of subcarriers occupied by the target reference signal is 6, the target-reference-signal sequence comprises at least one of the following sequences to reduce at least one of an average value of a shift auto-correlation, a value of a peak-to-average power ratio (PAPR), or an average value of a cross-correlation to be less than a threshold:
   5, −7, 7, 1, 5, 1;
   −3, 7, −5, −1, −5, −1; or
   5, 7, −3, −5, 5, −5.

2. The method according to claim 1, wherein
   in a case that the number of subcarriers occupied by the target reference signal is 6, the target-reference-signal sequence further comprises at least one of the following sequences:
   7, 3, −1, −5, −1, 3;
   7, −5, 7, −5, 7, 3;
   5, −7, 5, −7, −3, −7;
   3, 1, 5, 1, 5, −7;
   1, 5, −7, 7, 1, 5;
   7, −5, 3, 5, −1, −7;
   3, −1, 3, −3, −5, −1;
   5, −1, −3, −1, 5, −5;
   7, −7, 1, 5, 3, −3;
   7, 1, 7, −3, −1, −3;
   7, 1, −5, −7, −5, 1;
   −5, 5, −1, −3, −1, 5; or
   −5, −1, −7, 7, −5, −1.

3. The method according to claim 2, wherein the target-reference-signal sequence further comprises at least one of the following sequences:
−1, 1, 5, −5, 7, 3;
3, 5, −1, 5, −1, −3;
7, −7, 5, 1, −3, 3;
7, −1, −3, 5, −7, 5;
7, 5, −7, 1, −3, 7;
−1, −3, 3, 5, −1, 5;
7, −1, 3, 1, 1, −5;
−3, −5, −5, 5, 1, −7;
3, −7, −3, −1, −5, 7; or
−7, 5, 7, −5, 1, −3.

4. The method according to claim 1, wherein in resource mapping for the target reference signal, for any demodulation reference signal (DMRS) port, a time domain orthogonal cover code (TD-OCC) is [+1, +1].

5. The method according to claim 1, wherein in resource mapping for the target reference signal, for any DMRS port, a frequency domain orthogonal cover code (FD-OCC) is [+1, +1].

6. The method according to claim 1, wherein the performing the first modulation and then discrete Fourier transform modulation on at least one of the target-reference-signal sequences to generate a target reference signal comprises:
in a case that a physical channel demodulation reference signal or a channel state information acquisition reference signal is transmitted based on transmission precoding, performing first modulation and then discrete Fourier transform modulation on the at least one of target-reference-signal sequences to generate the target reference signal.

7. The method according to claim 6, wherein in a case that the physical channel demodulation reference signal is transmitted based on the transmission precoding, the physical channel demodulation reference signal comprises one or more of the following: physical uplink shared channel demodulation reference signal (PUSCH) DMRS, physical downlink shared channel demodulation reference signal (PDSCH) DMRS, physical sidelink shared channel demodulation reference signal (PSSCH) DMRS, physical uplink control channel demodulation reference signal (PUCCH) DMRS, physical downlink control channel demodulation reference signal (PDCCH) DMRS, physical sidelink control channel demodulation reference signal (PSCCH) DMRS, and physical broadcast channel demodulation reference signal (PBCH) DMRS.

8. The method according to claim 6, wherein in a case that the channel state information acquisition reference signal is transmitted based on the transmission precoding, the channel state information acquisition reference signal comprises one or more of the following: sounding reference signal (SRS) and channel state information reference signal (CSI-RS).

9. The method according to claim 1, further comprising:
generating the target-reference-signal sequence according to a predetermined rule; wherein
the predetermined rule comprises one or more of the following:
the target reference signal is a reference signal with a smallest average value of the shift auto-correlation between reference signal modulation symbols in a reference signal sequence table;
the target reference signal is a reference signal with a smallest value of the peak-to-average power ratio (PAPR) value of corresponding time-domain symbols resulting from inverse Fourier transform on the reference signal modulation symbols in the reference signal sequence table;
the target reference signal is a reference signal with a smallest average value of the cross-correlation between the reference signal modulation symbols in the reference signal sequence table; and
demodulation performance of the target-reference-signal sequence meets a specified requirement.

10. A first communications device, comprising: a processor; a memory; and a program stored in the memory and capable of running on the processor, wherein the program, when the program is executed by the processor, cause the processor to perform the following steps of the method for reference signal generation:
in a case that indication information is received from a second communications device, perform first modulation and then discrete Fourier transform modulation on at least one of target-reference-signal sequences to generate a target reference signal, wherein the first modulation comprises any one of the following: π/2-binary phase shift keying (BPSK) modulation and 8-phase shift keying (PSK) modulation, and the indication information is used to indicate that the first communications device uses the target reference signal for transmission;
in a case that the number of subcarriers occupied by the target reference signal is 6, the target-reference-signal sequence comprises at least one of the following sequences to reduce at least one of an average value of a shift autocorrelation, a value of a peak-to-average power ratio (PAPR), or an average value of a cross-correlation to be less than a threshold:
5, −7, 7, 1, 5, 1;
−3, 7, −5, −1, −5, −1; or
5, 7, −3, −5, 5, −5.

11. The first communications device according to claim 10, wherein in a case that the number of subcarriers occupied by the target reference signal is 6, the target-reference-signal sequence further comprises at least one of the following sequences:
7, 3, −1, −5, −1, 3;
7, −5, 7, −5, 7, 3;
5, −7, 5, −7, −3, −7;
3, 1, 5, 1, 5, −7;
1, 5, −7, 7, 1, 5;
7, −5, 3, 5, −1, −7;
3, −1, 3, −3, −5, −1;
5, −1, −3, −1, 5, −5;
7, −7, 1, 5, 3, −3;
7, 1, 7, −3, −1, −3;
7, 1, −5, −7, −5, 1;
−5, 5, −1, −3, −1, 5; or
−5, −1, −7, 7, −5, −1.

12. The first communications device according to claim 11, wherein the target-reference-signal sequence further comprises at least one of the following sequences:
−1, 1, 5, −5, 7, 3;
3, 5, −1, 5, −1, −3;
7, −7, 5, 1, −3, 3;
7, −1, −3, 5, −7, 5;
7, 5, −7, 1, −3, 7;
−1, −3, 3, 5, −1, 5;
7, −1, 3, 1, 1, −5;
−3, −5, −5, 5, 1, −7;
3, −7, −3, −1, −5, 7; or
−7, 5, 7, −5, 1, −3.

13. The first communications device according to claim 10, wherein in resource mapping for the target reference signal, for any demodulation reference signal DMRS port, a time domain orthogonal cover code TD-OCC is [+1, +1].

14. The first communications device according to claim 10, wherein in resource mapping for the target reference signal, for any (DMRS) port, a frequency domain orthogonal cover code (FD-OCC) is [+1, +1].

15. The first communications device according to claim 10, wherein when the program is executed by the processor, the following steps are implemented:
  in a case that a physical channel demodulation reference signal or a channel state information acquisition reference signal is transmitted based on transmission precoding, performing the first modulation and then the discrete Fourier transform modulation on the at least one of the target-reference-signal sequences to generate the target reference signal.

16. The first communications device according to claim 15, wherein in a case that the physical channel demodulation reference signal is transmitted based on the transmission precoding, the physical channel demodulation reference signal comprises one or more of the following: physical uplink shared channel demodulation reference signal (PUSCH) DMRS, physical downlink shared channel demodulation reference signal (PDSCH) DMRS, physical sidelink shared channel demodulation reference signal (PSSCH) DMRS, physical uplink control channel demodulation reference signal (PUCCH) DMRS, physical downlink control channel demodulation reference signal (PDCCH) DMRS, physical sidelink control channel demodulation reference signal (PSCCH) DMRS, and physical broadcast channel demodulation reference signal (PBCH) DMRS.

17. The first communications device according to claim 15, wherein in a case that the channel state information acquisition reference signal is transmitted based on the transmission precoding, the channel state information acquisition reference signal comprises one or more of the following: sounding reference signal (SRS) and channel state information reference signal (CSI-RS).

18. The first communications device according to claim 10, wherein when the program is executed by the processor, the following steps are implemented:
  generating the target-reference-signal sequence according to a predetermined rule; wherein
  the predetermined rule comprises one or more of the following:
  the target reference signal is a reference signal with a smallest average value of the shift auto-correlation between reference signal modulation symbols in a reference signal sequence table;
  the target reference signal is a reference signal with a smallest value of the peak-to-average power ratio (PAPR) of corresponding time-domain symbols resulting from inverse Fourier transform on the reference signal modulation symbols in the reference signal sequence table;
  the target reference signal is a reference signal with a smallest average value of the cross-correlation between the reference signal modulation symbols in the reference signal sequence table; and demodulation performance of the target-reference-signal sequence meets a specified requirement.

19. A non-transitory computer-readable storage medium, wherein the computer-readable storage medium stores a computer program, and the computer program, when the computer program is executed by a processor, cause the processor to perform the following steps of a method for reference signal generation:
  in a case that indication information is received from a second communications device, perform first modulation and then discrete Fourier transform modulation on at least one of target-reference-signal sequences to generate a target reference signal, wherein the first modulation comprises any one of the following: $\pi/2$-binary phase shift keying (BPSK) modulation and 8-phase shift keying (PSK) modulation, and the indication information is used to indicate that the first communications device uses the target reference signal for transmission;
  in a case that the number of subcarriers occupied by the target reference signal is 6, the target-reference-signal sequence comprises at least one of the following sequences to reduce at least one of an average value of a shift autocorrelation, a value of a peak-to-average power ratio (PAPR), or an average value of a cross-correlation to be less than a threshold:
  5, −7, 7, 1, 5, 1;
  −3, 7, −5, −1, −5, −1; or
  5, 7, −3, −5, 5, −5.

20. The non-transitory computer-readable storage medium according to claim 19, wherein
  in a case that the number of subcarriers occupied by the target reference signal is 6, the target-reference-signal sequence further comprises at least one of the following sequences:
  7, 3, −1, −5, −1, 3;
  7, −5, 7, −5, 7, 3;
  5, −7, 5, −7, −3, −7;
  3, 1, 5, 1, 5, −7;
  1, 5, −7, 7, 1, 5;
  7, −5, 3, 5, −1, −7;
  3, −1, 3, −3, −5, −1;
  5, −1, −3, −1, 5, −5;
  7, −7, 1, 5, 3, −3;
  7, 1, 7, −3, −1, −3;
  7, 1, −5, −7, −5, 1;
  −5, 5, −1, −3, −1, 5;
  −5, −1, −7, 7, −5, −1;
  −1, 1, 5, −5, 7, 3;
  3, 5, −1, 5, −1, −3;
  7, −7, 5, 1, −3, 3;
  7, −1, −3, 5, −7, 5;
  7, 5, −7, 1, −3, 7;
  −1, −3, 3, 5, −1, 5;
  7, −1, 3, 1, 1, −5;
  −3, −5, −5, 5, 1, −7;
  3, −7, −3, −1, −5, 7; or
  −7, 5, 7, −5, 1, −3.

* * * * *